United States Patent [19]

Wilson

[11] Patent Number: 5,180,033
[45] Date of Patent: Jan. 19, 1993

[54] RECYCLABLE OIL CHANGE APPARATUS

[76] Inventor: Gary Wilson, 1717 SW. Park, Portland, Oreg. 97201

[21] Appl. No.: 794,291

[22] Filed: Nov. 14, 1991

Related U.S. Application Data

[63] Continuation of Ser. No. 512,031, Apr. 13, 1990, abandoned, which is a continuation of Ser. No. 313,873, Feb. 23, 1989, abandoned.

[51] Int. Cl.$^5$ .............................................. F16N 31/00
[52] U.S. Cl. ..................................... 184/1.5; 184/106; 220/573
[58] Field of Search ............... 184/1.5, 106; 141/10, 141/314; 220/571, 573; 206/223, 216; 229/103

[56] References Cited

U.S. PATENT DOCUMENTS

| | | | |
|---|---|---|---|
| 2,177,919 | 10/1939 | Vogt | 141/10 |
| 3,430,815 | 3/1969 | Weimer et al. | 206/219 |
| 4,022,257 | 5/1977 | O'Connell | 184/106 |
| 4,064,969 | 12/1977 | Black | 184/106 |
| 4,098,398 | 7/1978 | Meyers | 184/1.5 |
| 4,283,032 | 8/1981 | Smith | 184/1.5 |
| 4,442,936 | 4/1984 | Densham | 141/314 |
| 4,592,448 | 6/1986 | Morris | 184/1.5 |
| 4,762,155 | 8/1988 | Gruber | 184/1.5 |

*Primary Examiner*—Henry A. Bennet
*Assistant Examiner*—Denise L. F. Gromada
*Attorney, Agent, or Firm*—Kolisch Hartwell Dickinson McCormack & Heuser

[57] ABSTRACT

The invention is an oil changer intended to encourage proper disposal of used motor oil. It is comprised of an outer container made of cardboard and an inner container of polypropylene and a tie device to seal the motor oil in the inner container. The polypropylene material is non-reactive with the petroleum products and additives found in used engine oil; its tensile strength is approximately 8,000-pounds/inch$^2$, rendering it durable enough to prevent inadvertent oil spillage; and it can withstand temperatures of up to 320° F., making it possible to drain the engine oil into the inner container while the oil is hot. The tie device is of the cable tie variety, providing locking security against oil leakage. The sealed double containment of used engine oil within a durable outer container makes possible the safe and clean transportation, storage and handling of the oil changer during collection for recycling of both the used oil and the component parts of the oil changer itself.

3 Claims, 1 Drawing Sheet

1

RECYCLABLE OIL CHANGE APPARATUS

This is a continuation of application Ser. No. 07/512,031 filed Apr. 13, 1990, now abandoned, which was a continuation of application Ser. No. 07/313,873 filed Feb. 23, 1989, now abandoned.

BACKGROUND OF THE INVENTION

As public and private sources attempt to protect the environment from waste products through legislation and regulation, commercial development and public education, products and inventions emerge to meet the demands for environmental safeguards. My invention is aimed especially at that point in the process where waste becomes a potential pollutant; it collects the waste and encourages sound disposal of same. Effective coordination between originating manufacturer and public and private agencies would promote a significant enhancement of inroads made against environmental pollution.

Federal and state government regulations are increasingly defining oil, used oil, and oil by-products as toxic or hazardous waste. The harmful practice of disposing of used motor oil into sewer systems or via solid waste collection facilities can be obviated by using my invention. It is designed to collect used motor oil directly from the oil pan under the vehicle, replacing a plethora of devices commonly used for collection. My invention can also save the user the costs usually associated with clean-up in the area where oil is changed and is inexpensive to manufacture and purchase. All the components including the motor oil collected can be recycled.

DETAILED DESCRIPTION OF THE PREFERRED EMBODIMENT

My research has indicated that with new regulations many of the attempts to improve motor oil collection are now illegal. Further, my own invention is in compliance with the most rigorous of the new state regulations. Many of the states I have contacted have indicated a wholesale acceptance of the implementation of a system of curb-side recycling based around my invention.

Figure 3:
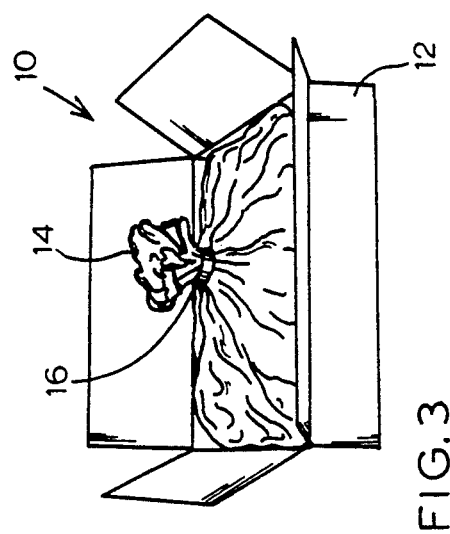
FIG. 3 shows the recycler apparatus with its tie device in place on the inner container, as the outer container is being closed for transporting and recycling of the motor oil.
Figure 2:
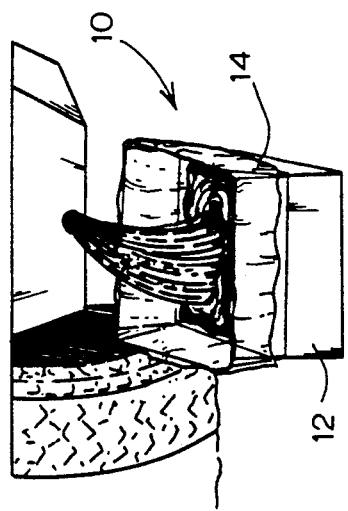
FIG. 2 shows the apparatus in use for draining hot used motor oil from a vehicle's oil pan.
Figure 1:
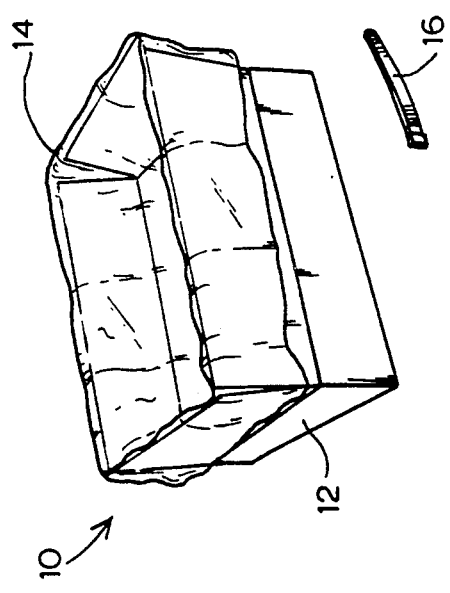
FIG. 1 shows the recycler apparatus of the invention in its preferred embodiment, as it is set up for oil recycling.

The apparatus of my invention in its preferred embodiment is indicated generally at 10 in FIGS. 1 through 3. It comprises an outer container 12 of recyclable cardboard with an inner liner 14 of polypropylene which tests at 8,800 p.s.i. and has a tolerance for hot oil of 320 degrees Fahrenheit (F.). The benefits of draining the oil hot can thus be engendered. The oil changer also comes with a non-twist type tie device 16 endorsed by the states of California and Maryland.

FIG. 1 shows how recycler apparatus 10 is set up for use in draining oil from a vehicle. Apparatus 10 in its preferred embodiment comprises an outer container 12, an inner container, or liner, 14 and a tie device 16. Outer container 12 preferably is a structurally stable, rectangular box made of biodegradable and recyclable material such as cardboard and having a substantially continuously extending bottom and substantially continuously extending sides the upper extents of which form movable flaps that are foldable inwardly. Inner liner 14 having a marginal edge as shown preferably is made of flexible, recyclable material such as polypropylene having a high tensile strength, e.g. preferably not less than 2,500-pounds/inch$^2$ (psi) and preferably approximately 8,000-pounds/inch$^2$, and being capable of retaining its oil impermeability at high temperatures, e.g. preferably not less than 250° F. and preferably approximately 320° F.

It has been discovered that a polypropylene material that is most suitable for use in liner 14. Importantly, such a material is substantially non-reactive to the variety of petroleum products, additives, and filings and other contaminants that typically are found in used engine oil when it is drained from a vehicle. Equally importantly, such a material produces a liner 14 capable of withstanding the high temperature that is incident to the draining of oil from an engine, which draining preferably is performed while the oil is hot to promote evacuation of sludge and filings from the vehicle's oil pan. Such a resin produces a liner 14 that, while containing used engine oil for extended periods of time up to several months, nevertheless does not degrade but instead retains its sealing containment attributes.

It has been determined that liner 14 is best made from seamless, tubular, polypropylene material of the variety described above, with the material having a nominal wall thickness of approximately 2-mils (0.002-inch), preferably with a tolerance of less than approximately ±10%. The thinness of the material's wall enhances the ability of the user to tightly gather the marginal edge that defines its opening to achieve sealed closure by tie device 16. In accordance with the preferred embodiment of the invention, a first marginal edge at one end of the tubular polypropylene material are double sealed by a process, e.g. heat welding at a proper pressure, that produces a seal strength that is at least 75% and preferably approximately 85% of the tensile strength of the polypropylene material from which liner 14 is made. The thinness of the material's wall enhances the ability of the user to tightly gather the marginal edge that defines its opening to achieve sealed closure by tie device 16. When liner 14 is made in accordance with the preferred embodiment disclosed herein, it is able to withstand the extremely high conditions of temperature and stress that accompany retailing apparatus 10, draining hot engine oil into liner 14, transporting apparatus 10 to a collection center, storing apparatus 10 in stacked arrangement with others at a collection center and, potentially, handling apparatus 10 by automatic equipment to break it down into oil and component parts for recycling.

Tie device 16 preferably is made of recyclable material and is of non-twist-type that is capable of securely gripping the non-sealed, gathered marginal edge of liner 14. Preferably tie device 16 is formed of nylon, is flexible and elongate with one side having a serrated surface, and has an integrally molded metal clip within an aperture in one end into which another end can be threaded, thereby to form a ratchet and pawl-like action when the other end is pulled through the aperture. Gathering the marginal edge of liner 14 and extending the gathered edge through the loop formed from such a threading operation permits the open end of liner 14 into which oil has been drained to be lockingly, sealingly bound shut. So-called cable ties, which are used in the electronics industry to securely bind together discrete wires of a wiring harness, have been found to be suitable for use in durably sealing inner liner 14. Tie device 16 unyieldingly, sealingly closes the open end of inner liner 14 around the drained engine oil, and resists its inadvertent removal or the leaking of oil from apparatus 10 therearound, despite intensive and extensive transport, storage and handling.

FIG. 1 shows inner liner 14 nested within container 12 with its outer edge extending over and around the outer edges of the flaps of container 12 to maintain them in an upright position as shown. Tie device 16 is shown resting on the ground nearby.

FIG. 2 shows apparatus 10 in use beneath the oil pan of a vehicle, with the used motor oil draining, preferably when hot, into inner liner 14 without spillage or leakage onto the ground beneath the car or onto outer container 12. Tie device 16 is not shown in FIG. 2. FIG. 2 shows an important advantage of the invention: the movable flaps of outer container 12 in their upright position, as stabilized by the overlapping marginal edge of liner 14, effectively increase the height of open container 12, thereby to provide substantial margin against oil spillage or splatter. Of course, when outer container is closed, thereby to contain oil-filled, inner liner 14 as shown in FIG. 3, no space is wasted, as the closing of the movable flaps reduces the size of container 12 to the preferably 5-quart capacity of apparatus 10.

FIG. 3 shows the oil contained within liner 14 of apparatus 10, with tie device 16 grippingly sealing the oil within liner 14. Liner 14 and its oil contents are seen to settle and conform generally to the shape of outer container 12. It also is seen from FIG. 3 that liner 14 and its sealed, fluid contents are stably supported by outer container 12. Finally, it is seen from FIG. 3 that the marginal edge of inner liner 14 has been lifted from its extended position over and around the flaps of outer container 12 with tie device 16 sealingly closing inner container 14 adjacent its gathered, marginal edge. As is seen from FIG. 3, this frees the flaps of outer container 12 for movement into a closed position of containment of sealed inner container 14. Once the flaps are folded and preferably secured, e.g. by crack-and-peel or fiber reinforced tape, to close outer container 12, device 10 is ready to be transported to a collection or recycling center.

The method for use of my invention can be readily observed in the accompanying drawings.

I claim:

1. Apparatus for changing and recycling used motor oil comprising:

a stiff outer container having a closeable opening that is substantially coextensive with the top of the outer container, the outer container having substantially continuously extending bottom and sides, an upper extent of the sides being moveable inwardly to substantially completely close the opening, wherein the opening of the outer container is formed by the upright positioning of plural movable flaps that form the upper extents of the sides of the outer container;

a flexible inner container for containing used motor oil, the inner container having a marginal edge dimensioned to provide an opening that is substantially coextensive with the opening of the outer container, the inner container being nested within the outer container thereby to line the inner surface of the outer container, the marginal edge of the inner container being dimensioned also to extend over and around thus temporarily to fix the flaps of the outer container in an upright position, thereby temporarily to increase the effective height of the sides of the outer container having the inner container nested therein with its marginal edge extending thereover to provide margin against spillage or splatter of oil being drained into the inner container, the inner container being formed of an oil-impervious material, the inner container being closeable to contain the oil by gathering its marginal edge, with such closing of the inner container releasing the flaps of the outer container from their temporarily fixed upright position; and a tie device for sealingly closing the inner container adjacent the marginal edge when the marginal edge is gathered, the inner container cooperating with the tie device to sealingly contain motor oil drained into the opening of the inner container nested in the outer container and the flaps of the outer container being movable out of their temporarily fixed upright position into a closed position of containment of the sealingly closed inner container of drained oil for recycling of the motor oil and said apparatus as a unit, wherein the inner container is formed of a material capable of withstanding temperatures of greater than approximately 250° F.

2. Apparatus for changing and recycling used motor oil comprising:

a stiff outer container having a closeable opening that is substantially coextensive with the top of the outer container, the outer container having substantially continuously extending bottom and sides, an upper extent of the sides being moveable inwardly to substantially completely close the opening, wherein the opening of the outer container is formed by the upright positioning of plural movable flaps that form the upper extents of the sides of the outer container;

a flexible inner container, having no absorbent means connected therewith, for containing used motor oil, the inner container having a marginal edge dimensioned to provide an opening that is substantially coextensive with the opening of the outer container, the inner container being nested within the outer container thereby to line the inner surface of the outer container, the marginal edge of the inner container being dimensioned also to extend over and around thus temporarily to fix the flaps of the outer container in an upright position, thereby temporarily to increase the effective height of the sides of the outer container having the inner container nested therein with its marginal edge extending thereover to provide margin against spillage or splatter of oil being drained into the inner container, the inner container being formed of an oil-impervious material, the inner container being closeable to contain the oil by gathering its marginal edge, with such closing of the inner container releasing the flaps of the outer container from their temporarily fixed upright position; and a tie device for sealingly closing the inner container adjacent the marginal edge when the marginal edge is gathered, the inner container cooperating with the tie device to sealingly contain motor oil drained into the opening of the inner container nested in the outer container and the flaps of the outer container being movable out of their temporarily fixed upright position into a closed position of containment of the sealingly closed inner container of drained oil for recycling of the motor oil and said apparatus as a unit, wherein the inner container is formed of a material having a tensile strength of greater than approximately 2,500-psi.

3. The apparatus of claims 1 or 2, wherein the inner container is formed of polypropylene material having a thickness of approximately 2-mils.

* * * * *